(12) United States Patent
Kim et al.

(10) Patent No.: US 11,699,791 B2
(45) Date of Patent: Jul. 11, 2023

(54) BINDER FOR SECONDARY BATTERY AND SECONDARY BATTERY INCLUDING THE SAME

(71) Applicant: SK ON CO., LTD., Seoul (KR)

(72) Inventors: Joon Sup Kim, Daejeon (KR); Sun Young Kim, Daejeon (KR); Dong Gun Lee, Daejeon (KR); Jee Hee Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 175 days.

(21) Appl. No.: 16/992,592

(22) Filed: Aug. 13, 2020

(65) Prior Publication Data

US 2021/0050595 A1 Feb. 18, 2021

(30) Foreign Application Priority Data

Aug. 16, 2019 (KR) .................. 10-2019-0100436
Jan. 7, 2020 (KR) .................. 10-2020-0002114

(51) Int. Cl.

| | |
|---|---|
| *H01M 4/62* | (2006.01) |
| *H01M 4/133* | (2010.01) |
| *H01M 4/134* | (2010.01) |
| *H01M 4/36* | (2006.01) |
| *H01M 4/587* | (2010.01) |
| *H01M 10/0525* | (2010.01) |
| *H01M 4/38* | (2006.01) |
| *H01M 4/02* | (2006.01) |

(52) U.S. Cl.
CPC ........... *H01M 4/622* (2013.01); *H01M 4/133* (2013.01); *H01M 4/134* (2013.01); *H01M 4/364* (2013.01); *H01M 4/386* (2013.01); *H01M 4/587* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 10,164,244 B2 | 12/2018 | Kinpara et al. | |
| 2011/0009520 A1* | 1/2011 | Figuly | A61L 27/50 |
| | | | 523/113 |
| 2020/0067098 A1 | 2/2020 | Choi et al. | |
| 2021/0210785 A1* | 7/2021 | Serizawa | H01M 4/622 |

FOREIGN PATENT DOCUMENTS

| | | | |
|---|---|---|---|
| CN | 101914213 | * | 12/2010 |
| JP | 2017142917 A | | 8/2017 |
| KR | 101617668 B1 | | 5/2016 |
| KR | 101764072 B1 | | 8/2017 |
| WO | WO 2019/088166 | * | 5/2019 |

* cited by examiner

*Primary Examiner* — Laura Weiner
(74) *Attorney, Agent, or Firm* — The Webb Law Firm

(57) ABSTRACT

A binder for a secondary battery includes a copolymer having a first repeating unit, a second repeating unit, and a third repeating unit. A ratio of a number of the first repeating unit (A) and a sum of a number of the second repeating unit and a number of the third repeating unit (B) is 90:10 to 52:48. A ratio of the number of the second repeating unit and the number of the third repeating unit is 67:33 to 1:99. A weight average molecular weight of the copolymer is 225,000 to 2,000,000.

10 Claims, 3 Drawing Sheets

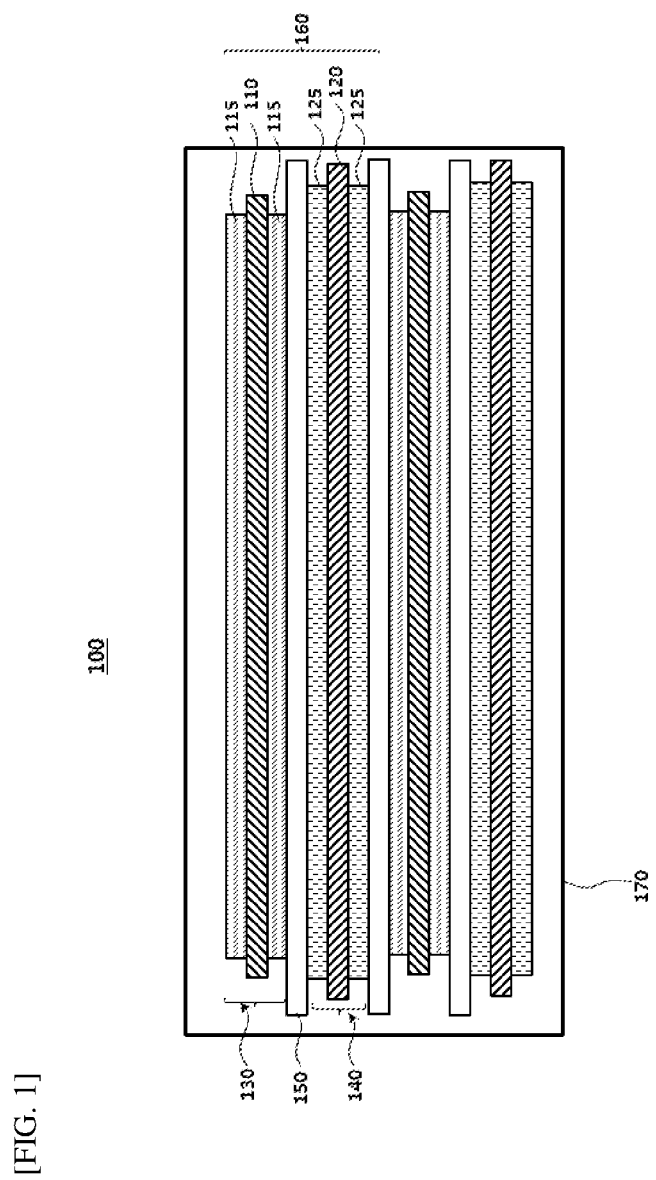
[FIG. 1]

[FIG. 2]
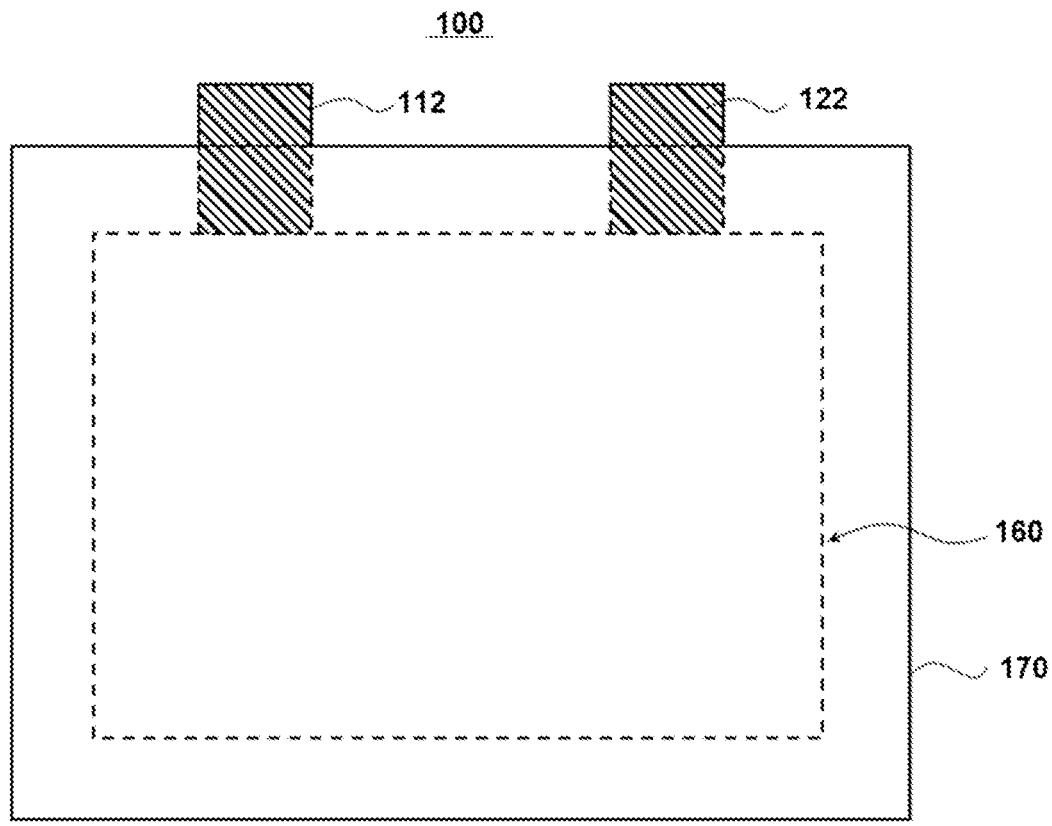
[FIG. 3]
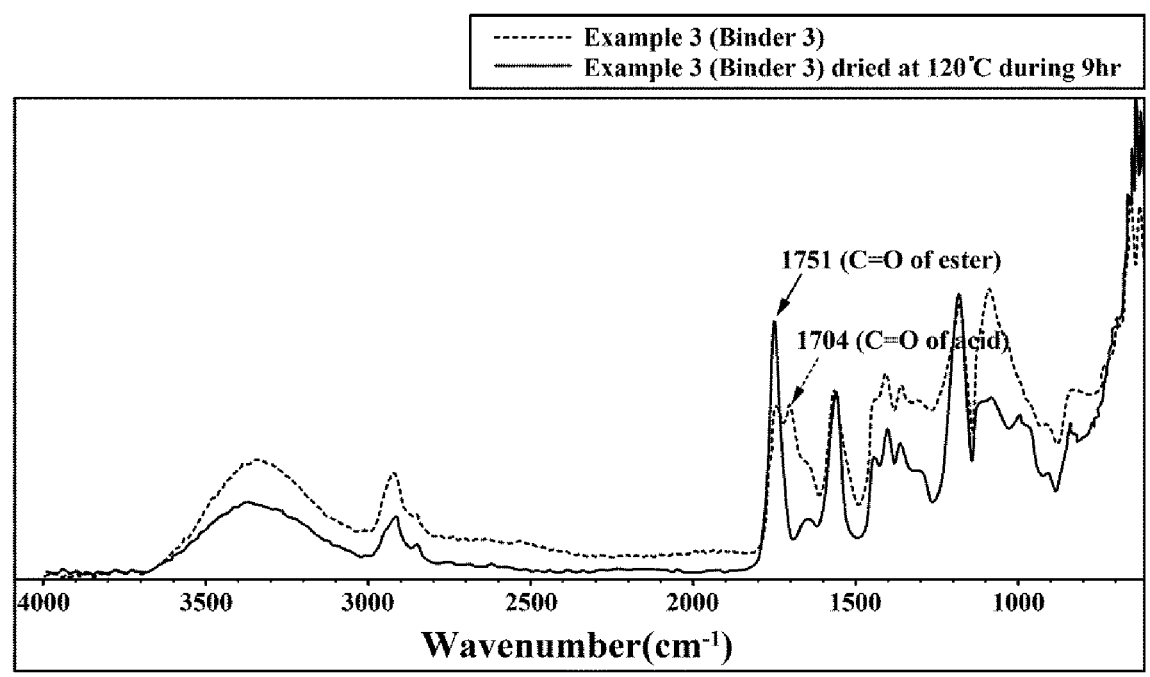

[FIG. 4]
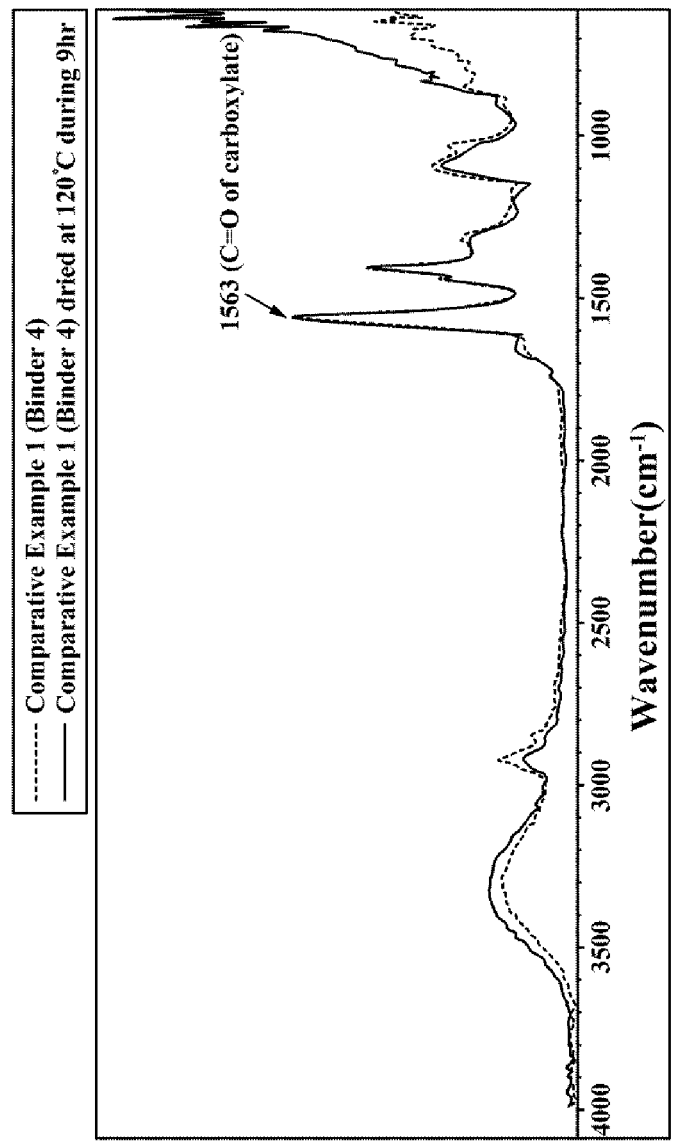

BINDER FOR SECONDARY BATTERY AND SECONDARY BATTERY INCLUDING THE SAME

CROSS-REFERENCE TO RELATED APPLICATION

This application claims priority to Korean Patent Applications Nos. 10-2019-0100436 and 10-2020-0002114, filed Aug. 16, 2019 and Jan. 7, 2020, respectfully, the disclosures of which are hereby incorporated by reference in their entirety.

BACKGROUND

1. Field

The present invention relates to a binder for a secondary battery and a secondary battery including the same. More particularly, the present invention relates to a binder for a secondary battery binding an electrode active material and a secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, the secondary battery or a battery pack including the same is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a lightening of weight, etc.

For example, a lithium secondary battery may include an electrode assembly including a cathode, an anode and a separator, and an electrolyte immersing the electrode assembly. The lithium secondary battery may further include an exterior case having, e.g., a pouch shape and enclosing the electrode assembly and the electrolyte.

Recently, as the application area of the lithium secondary battery is expanded, development of a lithium secondary battery having a higher capacity and power is in progress. For example, an anode material or a cathode material that can provide higher capacity are being studied.

A lithium metal oxide may be used as a cathode active material of the lithium secondary battery, and high capacity, high power, and high lifespan characteristics are desired to the lithium secondary battery.

For example, alternative materials for anodes including conventional carbon-based materials are being studied. When the anode material is changed, the binder contacting or reacting with the anode needs to be changed or newly designed. However, mechanical deformation of the anode may be caused by the changed binder, and in this case, stability or lifespan of the anode or the battery may be deteriorated.

For example, Korean Registered Patent No. 10-1764072 discloses a binder for a lithium iron phosphate electrode coated with carbon.

SUMMARY

According to an aspect of the present invention, a binder for a secondary battery having improved mechanical stability and operational reliability is provided.

According to an aspect of the present invention, a secondary battery having improved mechanical stability and operational reliability is provided.

According to exemplary embodiments of the present invention, a binder for a secondary battery includes a copolymer having a first repeating unit represented by Chemical Formula 1 below, a second repeating unit represented by Chemical Formula 2 below, and a third repeating unit represented by Chemical Formula 3 below. A ratio of a number of the first repeating unit (A) and a sum of a number of the second repeating unit and a number of the third repeating unit (B) is 90:10 to 52:48. A ratio of the number of the second repeating unit and the number of the third repeating unit is 67:33 to 1:99. A weight average molecular weight of the copolymer is 225,000 to 2,000,000;

[Chemical Formula 1]

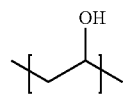

[Chemical Formula 2]

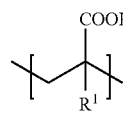

In Chemical Formula 2, $R^1$ is hydrogen or an alkyl group having 1 to 5 carbon atoms.

[Chemical Formula 3]

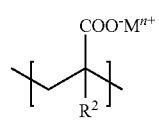

In Chemical Formula 3, $R^2$ is hydrogen or an alkyl group having 1 to 5 carbon atoms, $M^{n+}$ is a cation with an oxidation number of n and excluding a hydrogen ion, and n is an integer of 1 to 3.

In some embodiments, a percentage of the number of the first repeating unit with respect to a sum of the number of the first repeating unit, the number of the second repeating unit, and the number of the third repeating unit may be 65% to 85%.

In some embodiments, a ratio of the number of the second repeating unit and the number of the third repeating unit may be 50:50 to 1:99.

In some embodiments, a pH value measured at a condition of 15° C. to 25° C. for an aqueous solution containing the copolymer in 8% by weight may be 5 to 10.

In some embodiments, the copolymer may be included in an amount of 10% to 100% with respect to a total weight of the binder.

In some embodiments, $R^2$ may be hydrogen or a methyl group.

In some embodiments, the copolymer may have a tensile strength of 1,000 kgf/cm² to 3,000 kgf/cm² when forming a film having a thickness of 20 μm to 80 μm In some embodiments, the copolymer may be a random copolymer.

According to exemplary embodiments of the present invention, a binder for a secondary battery includes a copolymer having a first repeating unit represented by Chemical Formula 1 below, a second repeating unit represented by Chemical Formula 2 below, and a third repeating unit represented by Chemical Formula 3 below. A ratio of a number of the first repeating unit (A) and a sum of a number of the second repeating unit and a number of the third repeating unit (B) is 90:10 to 52:48. A ratio of the number of the second repeating unit and the number of the third repeating unit is 67:33 to 1:99. The copolymer has a tensile strength of 1,000 kgf/cm² to 3,000 kgf/cm² when forming a film having a thickness of 20 μm to 80 μm.

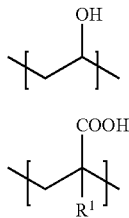

[Chemical Formula 1]

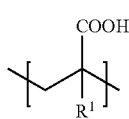

[Chemical Formula 2]

In Chemical Formula 2, $R^1$ is hydrogen or an alkyl group having 1 to 5 carbon atoms.

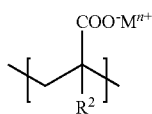

[Chemical Formula 3]

In Chemical Formula 3, $R^2$ is hydrogen or an alkyl group having 1 to 5 carbon atoms, $M^{n+}$ is a cation with an oxidation number of n and excluding a hydrogen ion, and n is an integer of 1 to 3.

According to exemplary embodiments of the present invention, a secondary battery includes a cathode, a separator and an anode facing the cathode with the separator interposed therebetween, and including an anode current collector and an anode active material layer formed on the anode current collector. The anode active material layer includes the binder for a secondary battery according to the exemplary embodiments, and an anode active material including a silicon-based active material.

According to exemplary embodiments of the present invention, the anode active material further may include a carbon-based active material.

According to exemplary embodiments of the present invention, the anode active material may include a composite of the carbon-based active material and the silicon-based active material.

According to exemplary embodiments of the present invention, a mass ratio of the carbon-based active material and the silicon-based active material in the composite may be 3:97 to 97:3.

According to exemplary embodiments of the present invention, the binder for a secondary battery may be included in 0.5% to 40% with respect to a total weight of the anode active material layer.

According to exemplary embodiments, the binder for a secondary battery may include a copolymer including three different repeating units and having a predetermined weight average molecular weight. The copolymer may have improved tensile strength, and coating property and adhesive strength of an active material to a current collector may be improved by the copolymer.

The copolymer may include a repeating unit having a carboxyl group (—COOH) in a predetermined ratio, so that may cause an additional crosslinking reaction during a manufacturing process of a secondary battery (for example, in a heating process). Thus, mechanical and chemical stability of an electrode structure can be increased.

Additionally, when the electrode is manufactured with the binder, a volume change (expansion and contraction) during repeatedly charging and discharging the secondary battery may be reduced, and peeling off an active material layer may be prevented. Therefore, even when a silicon-based active material is used, a lifespan of the secondary battery can be improved.

BRIEF DESCRIPTION OF THE DRAWINGS

FIG. 1 is a schematic cross-sectional view illustrating a lithium secondary battery in accordance with exemplary embodiments;

FIG. 2 is a schematic planar view illustrating a lithium secondary battery in accordance with exemplary embodiments;

FIG. 3 is a FT-IR (Fourier-Transform Infrared spectroscopy) spectrum for binder 3 of Example 3 which is heat-treated.

FIG. 4 is a FT-IR spectrum for binder 4 of the Comparative Example 1 which is heat-treated.

DETAILED DESCRIPTION OF THE EMBODIMENTS

According to exemplary embodiments of the present invention, a binder for a secondary battery including a copolymer including specific repeating units different from each other and having a predetermined weight average molecular weight is provided to improve an expansion rate and a lifespan. Additionally, a secondary battery including the binder is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first" and "second" used herein are not intended to specify a number or an order of objects, but only used to identify different elements or objects from each other.

A binder for a secondary battery according to exemplary embodiments includes a copolymer including a first repeating unit, a second repeating unit, and a third repeating unit. The copolymer may have a relatively high tensile strength, for example, even when using a silicon-based active material, decomposition and/or collapse of an active material can be prevented by suppressing expansion/contraction of an electrode. Therefore, a stable capacity and power of a secondary battery can be maintained for a long time even during repeated charging/discharging.

The first repeating unit is represented by Chemical Formula 1 below, the second repeating unit is represented by Chemical Formula 2 below, and the third repeating unit is represented by Chemical Formula 3 below.

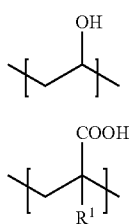

[Chemical Formula 1]

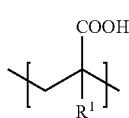

[Chemical Formula 2]

In Chemical Formula 2, $R^1$ is hydrogen or an alkyl group having 1 to 5 carbon atoms.

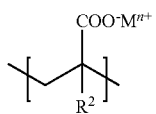

[Chemical Formula 3]

In Chemical Formula 3, $R^2$ is hydrogen or an alkyl group having 1 to 5 carbon atoms, $M^{n+}$ is a cation with an oxidation number of n and excluding a hydrogen ion, and n is an integer of 1 to 3.

For example, when n is 1, $M^+$ may be $Li^+$, $Na^+$ or $NH_4^+$. M may be a metal such as Ca or Mg when n is 2, and Al or Ga when n is 3. The copolymer may include the repeating unit of Chemical Formula 3 to be present as a form of an acrylic acid salt in an anode active material layer or an electrolyte solution.

Preferably, $R^2$ may be hydrogen or a methyl group, in this case, coating property and adhesive strength of the binder may be improved.

The first repeating unit may be derived from a first monomer including a vinyl ester such as a vinyl alcohol, a vinyl acetate, and the like. For example, the vinyl acetate may be copolymerized and then may form the first repeating unit through an ester decomposition reaction (for example, saponification reaction) in which an acetate group (—OCOCH3) becomes a hydroxyl group (—OH).

The second repeating unit may be formed by neutralizing at least a portion of the third repeating unit with an acid. In the neutralization reaction, an inorganic acid and/or an organic acid may be used.

The third repeating unit may be derived from a second monomer including an acrylic acid ester-based compound. The acrylic acid ester-based compound may include an acrylate-based compound and a methacrylate-based compound. For example, methyl acrylate may be copolymerized and then may become a salt form with a carboxylate group (—COO—) through a saponification reaction to form the third repeating unit.

In example embodiments, the copolymer may be a random copolymer in which the first repeating unit, the second repeating unit, and the third repeating unit are irregularly arranged.

A ratio of a number of the first repeating unit (A) to a sum of a number of the second repeating unit and a number of the third repeating unit (B) may be 90:10 to 52:48. For example, the copolymer may be formed by polymerizing the first monomer and the second monomer in a molar ratio of about 90:10 to 52:48.

When the first repeating unit is included less than the above molar ratio range, elasticity of the binder may be deteriorated and adhesive force of the binder with a current collector may be lowered, so that life cycle performance can be degraded. When the first repeating unit is included more than the above molar ratio range, adhesion of the binder to the active material and the current collector may be deteriorated.

Preferably, the copolymer may include the first repeating unit in 65 mol % to 85 mol %. For example, a ratio of the first repeating unit may be 65 to 85% of a total number of the first repeating unit, the second repeating unit, and the third repeating unit.

A ratio of a number of the second repeating unit to a number of the third repeating unit may be 67:33 to 1:99. For example, a degree of acidification of the copolymer may be 1 to 67%.

The term "acidity of the copolymer" used herein, may indicate a degree in which the third repeating unit is converted to the second repeating unit by an acidification reaction.

When the second repeating unit is less than 1:99 with respect to the third repeating unit, a carboxyl group (—COOH) content of the copolymer may be too lowered. In this case, a crosslinking reaction caused by the carboxyl group may not occur substantially, and a tensile strength and an adhesive strength of the copolymer may be significantly reduced.

When the second repeating unit is more than 67:33 with respect to the third repeating unit, an acid value derived from the second repeating unit may be excessively increased, and solubility in water may be decreased to cause a slurry of poor dispersibility.

Preferably, a ratio of the number of the second repeating unit to the number of the third repeating unit may be 50:50 to 1:99.

In exemplary embodiments, a weight average molecular weight of the copolymer may be 225,000 to 2,000,000.

When the weight average molecular weight is less than 225,000, a coatability of a slurry containing the binder for a secondary battery and an adhesion strength of an electrode active material layer manufactured using slurry may be significantly deteriorated. When the weight average molecular weight is more than 2,000,000, a solubility of the binder may be lowered, and a coatability of a slurry may be significantly deteriorated.

In exemplary embodiments, the copolymer may have a pH of 5 to 10 in an aqueous solution containing the copolymer in 8% by weight. The pH can be measured at a temperature of 15° C. to 25° C.

When pH is less than 5 when the copolymer is made of an 8% by weight aqueous solution, a solubility in water may be decreased due to a high carboxyl group content, so that a dispersibility regarding to an active material and a coating property to an electrode may be degraded.

When pH is more than 10 when the copolymer is made of an 8% by weight aqueous solution, the carboxylic acid content in the copolymer may be low, and crosslinking reaction may occur insufficiently. In this case, a tensile strength and an adhesive strength of an electrode active material layer may be decreased; so that suppression of expansion caused by repeated charging and discharging the secondary battery may become difficult.

In exemplary embodiments, a tensile strength of a film having a thickness of 20 μm to 80 μm and made of the copolymer may be 1,000 kgf/cm² to 3,000 kgf/cm². For example, the film may be formed by coating and subsequently drying an aqueous solution containing the binder for a secondary battery of the present invention on a substrate.

When the tensile strength is less than 1,000 kgf/cm², an electrode formed of the binder for a secondary battery can be greatly expanded during repeated charge and discharge. Therefore, a structure of the electrode may be damaged and destroyed, so that an efficiency and lifespan of a battery may be reduced.

When the tensile strength is more than 3,000 kgf/cm², a volume change of an active material particle (for example, silicon nanoparticle) during charging and discharging may be excessively suppressed, so that a capacity of the battery may not be sufficiently improved. Additionally, since elasticity and flexibility of the binder may be decreased, so that mechanical stress generated by repeated volume change cannot be endured to deteriorate cycle performance of an electrode.

The binder for a secondary battery may include an organic based binder such as a polyvinylidene fluoride-hexafluoropropylene copolymer (PVDF-co-HFP), polyvinylidenefluoride (PVDF), polyacrylonitrile, polyacrylamide, polymethylmethacrylate, etc., or an aqueous based binder such as styrene-butadiene rubber (SBR). The binder may be used with a thickener such as carboxymethyl cellulose (CMC). In some embodiments, the binder for a secondary battery may include the copolymer and SBR-based binder together.

In example embodiments, the copolymer may be included in an amount of 10% to 100% with respect to a total weight of the binder.

If a content of the copolymer is less than 10% by weight, a mechanical strength and adhesive strength of the electrode active material layer may be decreased, so that suppressing an expansion of a secondary battery during repeated charge and discharge may become difficult.

The binder for a secondary battery may fix a cathode active material and/or an anode active material of the secondary battery. For example, the binder for a secondary battery may be mixed with the cathode active material or the anode active material to form a slurry, and the slurry may be applied on a current collector to form a cathode or an anode. Preferably, the binder for a secondary battery can be used for an anode including the silicon-based active material.

FIG. 1 is a schematic cross-sectional view illustrating a lithium secondary battery in accordance with exemplary embodiments.

Referring to FIG. 1, a secondary battery 100 may include an electrode cell 160 including a cathode 130, an anode 140, and a separator 150 interposed between the cathode 130 and the anode 140. The electrode cell 160 may be impregnated with the electrolyte and be enclosed in the case 170.

The cathode 130 may include a cathode active material layer 115 formed by applying a cathode active material to a cathode current collector 110.

The cathode active material layer 115 may be formed on at least one of an upper surface and a lower surface of the cathode current collector 110. According to exemplary embodiments, the cathode active material layer 115 may be formed on upper and lower surfaces of the cathode current collector 110, respectively.

The cathode active material may include a compound capable of reversibly intercalating and deintercalating a lithium ion.

In example embodiments, the cathode active material may include a lithium-transition metal oxide. For example, the lithium-transition metal oxide may include nickel (Ni), and may further include at least one of cobalt (Co) or manganese (Mn).

For example, the lithium-transition metal oxide may be represented by Chemical Formula 4 below.

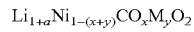

$$Li_{1+a}Ni_{1-(x+y)}Co_xM_yO_2$$ [Chemical Formula 4]

In Chemical Formula 4, a, x, and y may be in ranges of $-0.05 \leq a \leq 0.15$, $0.01 \leq x \leq 0.3$, and $0.01 \leq y \leq 0.3$, respectively. And, M may be at least one element selected from a group consisting of Mn, Mg, Sr, Ba, B, Al, Si, Ti, Zr and W.

The cathode active material may be mixed and stirred together with a binder, a conductive additive and/or a dispersive additive in a solvent to form a slurry. The slurry may be coated on the cathode current collector 110, and dried and pressed to obtain the cathode 130.

The cathode current collector 110 may include stainless-steel, nickel, aluminum, titanium, copper or an alloy thereof. Preferably, aluminum or an alloy thereof may be used.

For example, a PVDF-based binder may be used as a cathode binder. In this case, an amount of the binder for forming a cathode active material layer may be decreased, and an amount of a cathode active material may be relatively increased. Thus, capacity and power of the lithium secondary battery may be improved.

The conductive additive may be added to facilitate an electron mobility between active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

The anode 140 may include an anode current collector 120 and an anode active material layer 125 formed on the anode current collector 120. An anode active material layer 125 may be formed by coating an anode active material on the anode current collector 120.

The anode active material layer 125 may be formed on at least one of an upper surface and a lower surface of the anode current collector 120. According to exemplary embodiments, the anode active material layer 125 may be formed on upper and lower surfaces of the anode current collector 120, respectively.

According to exemplary embodiments, a silicon (Si)-based active material may be used as the anode active material. The silicon-based compound may include silicon (Si), silicon oxide ($SiO_x$), silicon carbide (SiC), and the like.

For example, a capacity and power properties can be increased by using a silicon-based active material. However, since the silicon-based active material has a high expansion/contraction rate of volume, expansion and contraction of the anode active material layer 125 or a anode active material particle may be repeated during repeated charge/discharge.

According to exemplary embodiments, the anode active material may further include a carbon-based active material. The carbon-based active material may include crystalline or amorphous graphite, and may include at least one of artificial graphite, natural graphite, soft carbon, hard carbon, carbon nanotube, carbon fiber, pitch, and cokes.

In example embodiments, the anode active material may include a composite of the silicon-based active material and the carbon-based active material. The composite may include a silicon oxide-carbon complex, a silicon-silicon oxide-carbon complex, and the like.

For example, the composite may include a silicon-carbon particle in which a carbon core and a silicon coating layer form a core-shell structure.

The silicon-carbon particle may be formed, for example, by depositing a silicon layer on a surface of a graphite core. In some embodiments, the silicon-carbon particle may be formed by coating a silicon layer on a commercially available graphite particle through a chemical vapor deposition (CVD) process using a silicon precursor compound such as a silane-based compound.

In some embodiments, the silicon-carbon particle may have a coated or laminated structure in which a plurality of carbon coating layers and silicon coating layers are alternately and repeatedly disposed on the graphite core.

Conventionally, a carbon-based material has been used alone as the anode active material, and a theoretical capacity limit of the carbon-based material may be about 370 mAh/g. However, according to exemplary embodiments, the silicon-based active material may be used together with the carbon-based material to significantly improve power and capacity properties of the secondary battery beyond the theoretical capacity limit of the carbon-based active material.

Additionally, by using the carbon-based active material (for example, artificial graphite and natural graphite) together with the silicon-based material, excessive electrode expansion occurred during repeated charge/discharge due to the silicon-based material may be buffered.

In some embodiments, when the carbon-based active material includes artificial graphite and natural graphite together, a weight ratio of artificial graphite to natural graphite may range from about 0.5 to 10. Within the above range, while improving a mechanical stability of an anode or a secondary battery through using artificial graphite, capacity/power may be additionally improved through using natural graphite.

When the anode active material includes a silicon-based active material and a carbon-based active material, or includes the composite, a mass ratio of the carbon-based active material and the silicon-based active material may be 3:97 to 97:3. Capacity and lifespan of the battery may be enhanced in the range of the above mass ratio.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersive additive in a solvent to form an anode slurry. The anode slurry may be coated on the anode current collector 120, and dried and pressed to produce the anode 140.

The binder for a secondary battery described above may be used as a anode binder. In this case, a problem of an excessive electrode deformation (due to repetition of shrinkage and expansion) caused by the silicon-based active material can be effectively solved by using the above binder. Therefore, while improving a capacity, energy density, etc. of the secondary battery through the silicon-based active material, deterioration of lifespan may also be prevented.

In example embodiments, the anode active material layer 125 may include 0.5% to 40% by weight of the binder. When a content of the binder is less than 0.5% by weight, suppression of deformation of the anode during charge and discharge cannot be achieved. When a content of the binder is more than 40% by weight, a capacity and energy density of the secondary battery may be reduced. For example, the anode active material layer 125 may be made of a anode slurry containing the binder in an amount of 0.5 to 40% by weight based on solid contents.

For example, the conductive additive may include a carbon-based material such as, carbon black, graphene, carbon nanotube, etc., and/or a metal-based material such as tin, tin oxide, titanium oxide, a perovskite material such as $LaSrCoO_3$ or $LaSrMnO_3$.

The separator 150 may be interposed between the cathode 130 and the anode 140. The separator 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separator 150 may include a glass fiber with a high melting point and a non-woven fabric formed from a polyethylene terephthalate fiber, or the like.

In some embodiments, an area and/or a volume of the anode 140 (e.g., a contact area with the separator 150) may be greater than that of the cathode 130. Thus, lithium ions generated from the cathode 130 may be easily transferred to the anode 140 without loss by, e.g., precipitation or sedimentation.

In example embodiments, an electrode cell 160 may be defined by the cathode 130, the anode 140 and the separator 150, and a plurality of the electrode cells 160 may be stacked to form an electrode assembly having, e.g., a jelly roll shape. For example, the electrode assembly may be formed by winding, laminating or folding of the separator 150.

As illustrated in FIG. 2, electrode tabs (cathode tab and anode tab) may protrude from the cathode current collector 110 and the anode current collector 120 belonging to each electrode cell 160, respectively, and may extend to a side portion of an external case 170. The electrode tabs may be fused together with the one side portion of the exterior case 170 to form electrode leads (cathode lead 112 and anode lead 122) extending and/or exposed to outside of the exterior case 170.

The lithium secondary battery 100 may be fabricated into a cylindrical shape using a can, a prismatic shape, a pouch shape, a coin shape, etc.

The electrode assembly 160 may be enclosed in an exterior case 170 together with an electrolyte to define a lithium secondary battery. In example embodiments, the electrolyte may include a non-aqueous electrolyte solution.

The non-aqueous electrolyte solution may include a lithium salt of an electrolyte and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2^-)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Synthesis Example 1-1: Synthesis of Vinyl Acetate/Methyl Acrylate Copolymer 84 g of water, 0.88 g of sodium dodecylbenzene sulfonate (SDBS), and 0.13 g of sodium hydrogen carbonate were added in a round-bottom flask, and the round-bottom flask was replaced with a nitrogen atmosphere. A temperature inside the flask was elevated to about 60° C., and an aqueous solution in which 0.04 g of potassium persulfate dissolved in 2 g of water was added into the flask. Monomers including 30 g of vinyl acetate and 13.0 g of methyl acrylate were added dropwise for about 3 hours immediately thereafter, and then the solution in the flask was further stirred at about 65° C. for about 2 hours to complete a reaction. Thereafter, the polymerizing solution was added to 450 g of a saturated aqueous sodium chloride solution to aggregate a copolymer, and then the solid was filtered and dried to obtain about 40 g of a vinyl acetate/methyl acrylate copolymer. The obtained polymer was dissolved in THF and filtered with a filter. The weight average molecular weight measured by a molecular weight measuring device (GPC, RI detector) was about 800 kDa.

Synthesis Example 1-2: Saponification Reaction 150 ml of water, 150 ml of methanol, 14.1 g of sodium hydroxide, and 30 g of the vinyl acetate/methyl acrylate copolymer obtained in Synthesis Example 1-1 were put into a round bottom flask. Then, the temperature in the flask was raised to about 60° C., and the solution in the flask was stirred overnight to complete a saponification reaction. Thereafter, a copolymer saponifying solution was added to 1 L of methanol to precipitate the saponified copolymer, and the solid was filtered and dried to obtain about 16.5 g of a saponified vinyl alcohol/sodium acrylate copolymer.

Synthesis Example 1-3: Acidification 184 g of water and 16 g of the saponified vinyl alcohol/sodium acrylate copolymer of Synthesis Example 1-2 were added into a round-bottom flask, and the solution in the flask was heated to about 60° C. and stirred for about 6 hours to completely dissolve the polymer. Thereafter, the aqueous polymer solution was cooled to room temperature. 8.3 ml of an aqueous hydrochloric acid solution having 1 normal concentration was added into the flask, and the reaction solution was acidified by stirring for about 6 hours. The reaction solution was added to a mixture solution of 1 L of acetone and 200 ml of ethanol to obtain a precipitate, and then the solid was filtered and dried to obtain about 15 g of a vinyl alcohol (VA)/sodium acrylate (AANa)/acrylic acid (AA) copolymer. The composition ratio of vinyl alcohol/sodium acrylate/acrylic acid of the copolymer was about 2.5/1.0/0.1 in molar ratio.

Synthesis Example 1-4

8 g of vinyl alcohol/sodium acrylate/acrylic acid copolymer obtained in Synthesis Example 1-3 and 92 g of water was put into a round bottom flask. Then, the temperature inside the flask was raised to about 60° C. The solution in the flask was stirred for about 6 hours to prepare binder 1 contained in 8% by weight within an aqueous solution. pH of the aqueous solution was about 7.94.

Synthesis Example 2

In Synthesis Example 1-3, same series of manufacturing procedures except for using 24.8 ml of 1 normal concentration hydrochloric acid aqueous solution was conducted to obtain an aqueous solution of binder 2. The weight average molecular weight of the synthesized copolymer was about 800 kDa, and the composition ratio of vinyl alcohol/sodium acrylate/acrylic acid was about 3.1/1.0/0.4 in molar ratio. pH of the aqueous solution was about 7.27.

Synthesis Example 3

The same series of manufacturing procedures except for using 33 g of vinyl acetate and 10.3 g of methyl acrylate in Synthesis Example 1-1 and using 34.2 ml of an aqueous solution of hydrochloric acid at a normal concentration of 1 in Synthesis Example 1-3 was conducted to obtain an aqueous solution of binder 3. The weight average molecular weight of the synthesized copolymer was about 750 kDa, and the composition ratio of vinyl alcohol/sodium acrylate/acrylic acid was about 6.3/1.0/1.0 in molar ratio. pH of the aqueous solution was about 5.56.

Synthesis Example 4

8 g of vinyl alcohol/sodium acrylate copolymer obtained in Synthesis Example 1-2 without acidification and 92 g of water were put into a flask. Then, the temperature inside the flask was raised to about 60° C., the solution in the flask was stirred for about 6 hours to prepare an aqueous solution of binder 4. The weight average molecular weight of the synthesized vinyl acetate/sodium acrylate copolymer was about 800 kDa, and pH of the aqueous solution was about 10.52.

Synthesis Example 5

In Synthesis Example 1-1, the same series of manufacturing procedures except for using 0.4 g of potassium persulfate was conduct to obtain an aqueous solution of a copolymer solution and an aqueous solution of binder 5. The weight average molecular weight of the synthesized copolymer was about 130 kDa, and the composition ratio of vinyl alcohol/sodium acrylate/acrylic acid was about 2.5/1.0/0.1 in molar ratio. pH of the aqueous solution was about 7.89.

Synthesis Example 6

The same series of manufacturing procedures except for using 17.0 g of vinyl acetate and 26.4 g of methyl acrylate in Synthesis Example 1-1 and using 13.0 ml of an aqueous hydrochloric acid solution having a normal concentration of 1 in Synthesis Example 1-3 was conducted to obtain an aqueous solution of binder 6. The weight average molecular weight of the synthesized copolymer was about 780 kDa, and the composition ratio of vinyl alcohol/sodium acrylate/acrylic acid was about 0.7/1.0/0.1 in molar ratio. pH of the aqueous solution was about 8.75.

Experimental Example 1: Evaluation of Tensile Strength

Tensile strength was measured according to the method described in ASTM D638. The aqueous solutions of binders 1 to 6 were applied onto a substrate and dried to form a film with a thickness of 50 μm, and the film was cut with type IV to prepare a specimen. The specimen was pulled at a speed of 3 mm/min using a universal testing machine (UTM) to measure tensile strength when the specimen was deformed or broken. The measured values are shown in Table 1 below.

Experimental Example 2: Analysis for Crosslinking

The binders of Example 3 and Comparative Example 1 were heat treated at about 120° C. for about 9 hours, and the spectra of FIGS. 3 and 4 were obtained through FT-IR analysis.

FIG. 3 is a FT-IR (Fourier-Transform Infrared spectroscopy) spectrum for binder 3 of Example 3 which is heat-treated. FIG. 4 is a FT-IR spectrum for binder 4 of the Comparative Example 1 which is heat-treated.

Referring to FIGS. 3 and 4, the change of the C=O peak was not substantially observed before and after the heat treatment in case of the comparative example. However, in case of the binder of the example, the C=O peak area of AA was decreased by heat treatment, and the C=O peak area of the ester due to a reaction between the carboxyl group and alcohol was increased. Therefore, in the case of the anode of the example, the crosslinking reaction of the AA repeating unit was activated when heat-treated.

Preparation Example 1: Preparation of Anode

A anode active material was prepared by mixing 1.5 g of silicon oxide ($SiO_x$), 4.25 g of artificial graphite having an average particle diameter of 18 μm and 4.25 g of natural graphite having an average particle diameter of 12 μm. An aqueous binder in which the binder of Synthesis Examples 1 to 6, or styrene-butadienes (SBR) and carboxymethylcellulose (CMC) were mixed at a ratio of 2:1.5 was used. Carbon nanotube was prepared as a conductive material. Prepared anode active material, binder (based on solid content), and the conductive material were mixed in a weight ratio of 95.5:3.5:1, and the mixture was dispersed into water to prepare a anode slurry. The anode slurry was coated on a copper foil, dried for about 2 hours in an oven at about 100° C., pressed, and further dried in a vacuum oven at about 110° C. for about 12 hours to prepare a anode for a secondary battery.

The anode had a density of 1.65 g/cc.

Experimental Example 3: Evaluation of Coating Property

The coating properties when the anode slurry was coated on copper foil were evaluated based on the following criteria.

O: Uniformly coated as a whole (less than 5 aggregates per unit area (100×100 mm) are observed)

Δ: A small amount of aggregates are observed (5 or more and less than 20 aggregates per unit area (100×100 mm) are observed)

X: large amount of aggregates are observed (more than 20 aggregates per unit area (100×100 mm) are observed)

Experimental Example 4: Evaluation of Adhesion Force

For each of the anodes, adhesion force was measured using an adhesive force measuring device (IMADA Z Link 3.1). Specifically, after attaching a surface of the anode surface to the tape, the force when peeling off the tape at an angle of 90° was measured to evaluate the adhesive force.

TABLE 1

|  | Binder | Molar ratio (VA/AANa/AA) | Weigh average molecular weight (Mw, kDa) | pH (@8 wt %) | Coating property | Tensile strength (kgf/cm$^2$) | Adhesion force (N/20 mm) |
|---|---|---|---|---|---|---|---|
| Example 1 | Binder 1 | 69/28/03 | 800 | 7.94 | O | 1738 | 6.9 |
| Example 2 | Binder 2 | 69/22/09 | 800 | 7.27 | O | 1641 | 7.6 |
| Example 3 | Binder 3 | 76/12/12 | 750 | 5.56 | O | 1638 | 5.0 |
| Comparative Example 1 | Binder 4 | 69/31/00 | 800 | 10.52 | Δ | 936 | 3.8 |
| Comparative Example 2 | Binder 5 | 69/28/03 | 130 | 7.89 | X | 763 | 3.6 |
| Comparative Example 3 | Binder 6 | 40/54/06 | 780 | 8.75 | X | 1068 | 2.4 |
| Comparative Example 4 | SBR/CMC | SBR/CMC = 2/1.5 | — | 9.70 | Δ | 134 | 3.5 |

Referring to Table 1, the coating properties, tensile strength, and adhesive force of the anode slurry of the examples and the anode prepared using the anode slurry were significantly improved compared to Comparative Examples.

Preparation Example 2: Preparation of Battery

A slurry was prepared by mixing Li[$Ni_{0.88}Co_{0.1}Mn_{0.02}$]$O_2$ as a cathode active material, carbon black as a conductive material, and polyvinylidene fluoride (PVdF) as a binder in a weight ratio of 96.5:2:1.5. The slurry was uniformly applied to an aluminum foil having a thickness of 12 μm, and vacuum dried at 130° C. to prepare a cathode for a secondary battery.

The cathode and the anode prepared as described above are notched as predetermined size, respectively and stacked. A separator (polyethylene, 13 μm) was interposed between the cathode and the anode to form an electrode cell. Each tab part of the cathode and the anode was welded. The assembly of the welded anode/separator/cathode was placed in a pouch. Three sides of the pouch (e.g., except for an electrolyte injection side) were sealed. The tab portions were also included in sealed portions. An electrolyte was injected through the electrolyte injection side, and then the electrolyte injection side was also sealed. The assembly was impregnated for about 12 hours or more.

A solution in which 1 M $LiPF_6$ dissolved in a mixed solvent of EC/EMC/DEC (25/45/30; volume ratio) was used as the electrolyte.

Through this, a CR2016 coin-shaped half cell was prepared.

Experimental Example 5: Evaluation of Electrical Properties

The secondary batteries according to Preparation Examples 2 were charged (CC/CV 1/3 C 4.2V 0.05 C CUT-OFF) and discharged (CC 1/3 C 2.5V CUT-OFF). Initial charge/discharge capacities of the batteries were measured, respectively.

Charging/discharging efficiency was calculated as a percentage value obtained by dividing the initial discharge capacity by the initial charge capacity.

Additionally, the percentage of the discharge capacity at 50th cycle to the initial discharge capacity was calculated.

Experimental Example 6: Evaluation of Expanding Rate

The thickness of the anode ($t_1$) prepared according to Preparation Example 1 was measured, and the coin-type half cell prepared according to Preparation Example 2 was charged to 0.01 V at 0.1C-rate, and then the half cell was disassembled to measure the thickness of the anode after charging ($t_2$). The expansion rate (($t_2-t_1$)/$t_1$*100) was calculated.

TABLE 2

| | Binder | Charge capacity at 1st cycle [mAh/g] | Discharge capacity at 1st cycle [mAh/g] | Initial efficiency [%] | Capacity retention rate at 50th cycle [%] | Expansion rate [%] |
|---|---|---|---|---|---|---|
| Example 1 | Binder 1 | 571 | 497 | 87.0 | 95.2 | 42 |
| Example 2 | Binder 2 | 569 | 496 | 87.1 | 93.8 | 43 |
| Example 3 | Binder 3 | 572 | 497 | 86.8 | 90.5 | 48 |
| Comparative Example 1 | Binder 4 | 573 | 501 | 87.4 | 83.8 | 55 |
| Comparative Example 2 | Binder 5 | 566 | 459 | 81.1 | 74.8 | 73 |
| Comparative Example 3 | Binder 6 | 565 | 472 | 83.5 | 77.1 | 68 |
| Comparative Example 4 | SBR/CMC | 574 | 502 | 87.4 | 80.3 | 63 |

Referring to Table 2, the lifespans of the secondary battery of Examples were a excellent compared to that of Comparative Examples, and the expansion of the battery during charging and discharging was suppressed.

What is claimed is:

1. A binder for a secondary battery, comprising:
   a copolymer having a first repeating unit represented by Chemical Formula 1 below, a second repeating unit represented by Chemical Formula 2 below, and a third repeating unit represented by Chemical Formula 3 below,
   wherein a ratio of a number of the first repeating unit (A) and a sum of a number of the second repeating unit and a number of the third repeating unit (B) is 90:10 to 52:48,
   a ratio of the number of the second repeating unit and the number of the third repeating unit is 67:33 to 1:99, and
   a weight average molecular weight of the copolymer is 225 kDa to 2,000 kDa;

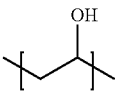

[Chemical Formula 1]

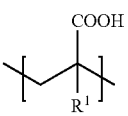

[Chemical Formula 2]

wherein, in Chemical Formula 2, $R^1$ is hydrogen or an alkyl group having 1 to 5 carbon atoms;

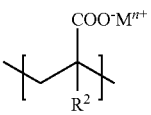

[Chemical Formula 3]

wherein, in Chemical Formula 3, $R^2$ is hydrogen or an alkyl group having 1 to 5 carbon atoms,
$M^{n+}$ is $Li^+$, $Na^+$, $NH_4^+$, $Ca^{2+}$, $Mg^{2+}$, $Al^{3+}$ or $Ga^{3+}$, and
n is an integer of 1 to 3.

2. The binder for a secondary battery according to claim 1, wherein a percentage of the number of the first repeating unit with respect to a sum of the number of the first repeating unit, the number of the second repeating unit, and the number of the third repeating unit is 65% to 85%.

3. The binder for a secondary battery according to claim 1, wherein a ratio of the number of the second repeating unit and the number of the third repeating unit is 50:50 to 1:99.

4. The binder for a secondary battery according to claim 1, wherein the copolymer has a pH value of 5 to 10, the pH value is measured at a condition of 15° C. to 25° C. for an aqueous solution containing the copolymer in 8% by weight based on a total weight of the aqueous solution.

5. The binder for a secondary battery according to claim 1, wherein the copolymer is included in an amount of 10% to 100% with respect to a total weight of the binder.

6. The binder for a secondary battery according to claim 1, wherein $R^2$ is hydrogen or a methyl group.

7. The binder for a secondary battery according to claim 1, wherein the copolymer is a random copolymer.

8. A secondary battery, comprising:
a cathode;
a separator; and
an anode facing the cathode with the separator interposed therebetween, and including an anode current collector and an anode active material layer formed on the anode current collector,
wherein the anode active material layer includes the binder for a secondary battery according to claim 1, and an anode active material including a silicon-based active material,
wherein the binder for a secondary battery is included in 0.5% to 40% with respect to a total weight of the anode active material layer.

9. The secondary battery according to claim 8, wherein the anode active material further includes a carbon-based active material in the form of a composite of the carbon-based active material and the silicon-based active material.

10. The secondary battery according to claim 9, wherein a mass ratio of the carbon-based active material and the silicon-based active material in the composite is 3:97 to 97:3.

\* \* \* \* \*